United States Patent

[11] 3,580,288

[72] Inventors Charles B. Schuder;
Victor E. Skov; Richard F. Lytle,
Marshalltown, Iowa
[21] Appl. No. 768,852
[22] Filed Oct. 18, 1968
[45] Patented May 25, 1971
[73] Assignee Fisher Governor Company

[54] FLOW CONTROL DEVICE INCLUDING A PRESSURE-BALANCED SINGLE-SEATED VALVE PLUG
5 Claims, 1 Drawing Fig.
[52] U.S. Cl. .................................................137/630.13,
137/630.15
[51] Int. Cl. ..................................................... F16k 11/22
[50] Field of Search.......................................... 137/629,
630, 630.15, 630.18, 630.21

[56] References Cited
UNITED STATES PATENTS
| | | | |
|---|---|---|---|
| 938,491 | 11/1909 | Knauf............................ | 137/630.14 |
| 1,031,294 | 7/1912 | Schutte ......................... | 137/630.13X |
| 1,797,054 | 3/1931 | Doran ........................... | 137/630.13 |
| 1,877,542 | 9/1932 | Wagner......................... | 137/630.11X |
| 2,561,214 | 7/1951 | Matson.......................... | 137/630.13 |

Primary Examiner—Clarence R. Gordon
Attorney—Molinare, Allegretti, Newitt & Witcoff ABSTRACT: A flow control device providing for large flow capacity together with tight shutoff by the use of large pressure balanced single-seated valve plug having passage means therethrough, with a separate single-seated valve plug for opening and closing the passage means, the large valve plug being opened and closed with a minimal force output actuator.

Patented May 25, 1971
3,580,288
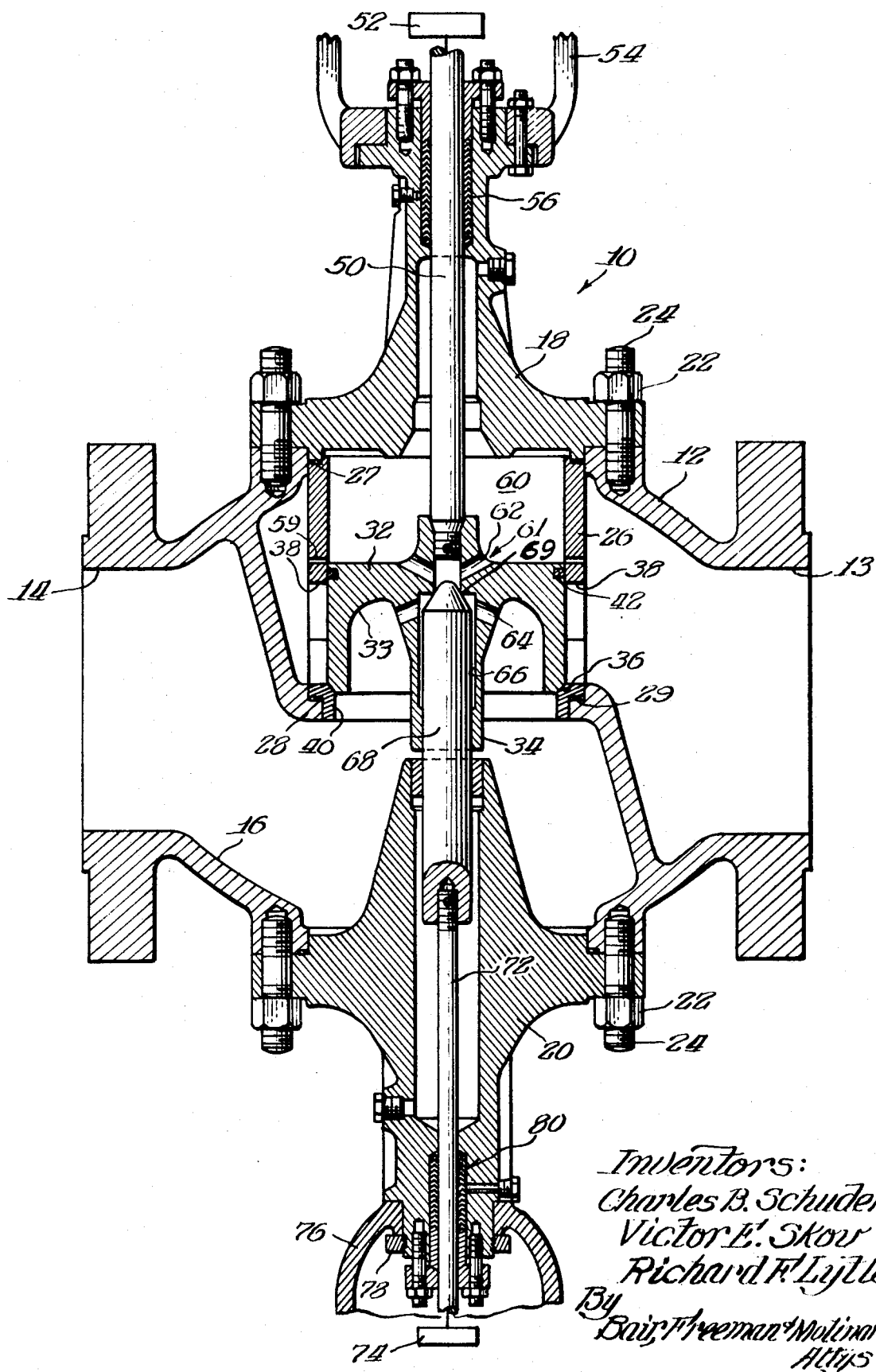
Inventors:
Charles B. Schuder
Victor E. Skow
Richard F. Lytle
By Bair, Freeman & Molinare
Attys

FLOW CONTROL DEVICE INCLUDING A PRESSURE-BALANCED SINGLE-SEATED VALVE PLUG

BACKGROUND OF THE INVENTION

This invention relates to a flow control device and, more particularly, to a flow control device for accommodating large flow capacity together with positive shutoff through utilization of a balanced valve plug capable of being throttled from closed to open and back to closed with a minimal force output actuator.

The design problems of tight shutoff and large flow capacity are sometimes at odds with one another. For example, where tight shutoff is of primary concern, single-ported valves are usually considered. As the pressure and/or the port size increases, large-size actuators are necessary for moving the valve and the size of the actuator often becomes the limiting factor in valve application. Under this design approach, many applications require several valves in parallel to do the requisite control job.

In the event that a large flow capacity is the prime consideration, then, double-ported valves are usually considered and because of their semibalanced nature, they can usually be handled with reasonably sized actuators. However, as the pressure drop increases, instability can become a problem and again a larger actuator is required. Where positive shutoff, in addition to large flow capacity, is required, this approach is usually not successful.

An object of the present invention is to provide an improved flow control device of large flow capacity having a balanced valve plug capable of being throttled from closed to open and back to closed with a minimal output actuator, such valve plug having positive shutoff when seated.

Another object of the present invention is to provide an improved large capacity flow control device having tight shutoff, such device utilizing a large pressure-balanced single-seated valve plug and a separate single-seated valve plug, the two valve plugs being selectively actuated by suitable actuating means, with the first valve plug controlling flow through the flow passage in the device and the second valve controlling flow through passage means in the first valve plug.

Yet another object of the present invention is to provide an improved flow control device having a cup-shaped main valve plug therein for controlling flow through the main flow passage in the valve body, with passage means in the main valve plug for registering pressure from the flow passage to a chamber above the piston remote from the flow passage, and with a separate single-seated valve plug for opening and closing the passage means, the valve plug for opening and closing the passage means through the main valve plug being operable to be opened before the main valve plug is opened to equalize pressure in the chamber above the valve plug with the pressure in the flow passage. Other objects and advantages of the present invention will be made more apparent hereinafter.

BRIEF DESCRIPTION OF THE DRAWING

There is shown in the single FIGURE of drawing attached a cross-sectional view of a flow control device embodying the present invention.

DETAILED DESCRIPTION OF THE PRESENT INVENTION

Referring now to the FIGURE of the drawing, there is shown a large flow capacity flow control device 10 which provides positive shutoff when he main or first valve plug and the second or secondary valve plug therein are seated. The flow control device 10 includes a main valve body 12 having an inlet 13 and an outlet 14 communicated by a flow passage 16 within the valve body 12. The flanges at the ends of the main valve body 12 are adapted to aid in the connection of the valve body in a pipeline. The housing means for the flow control device 10 includes not only the main valve body 12, but, also, the upper bonnet 18 and the lower bonnet 20. The bonnets 18 and 20 are suitably connected to the valve body by fastening means, for example, nuts 22 secured to studs 24.

Disposed within the housing FIGURE of flow control device 10 is a tubular valve plug cage 26. The cage 26 is retained between the upper bonnet 18 and a shouldering apertured wall 28 of the main valve body 12. Sealing gasket 27 is between bonnet 18 and the upper end of cage 26 and sealing gasket 29 is disposed between the cage 26 and a wall 28.

Movable axially within the valve cage 26 is the main valve plug 32. The main valve plug 32 takes the form of an inverted cup-shaped member having a central or post portion 34 extending downwardly therefrom. The lower end of the cup-shaped portion of main valve plug 32 is adapted to cooperate with a main valve seat 36, which in the illustrated embodiment of the invention, is defined by the lower end of the cage 26, but, which could be a separate element.

The cage 26 has flow openings 38 in the lower half thereof as well as an opening 40 defined through the lower end thereof. The upper half of the cage 26 acts as a cylinder for the valve plug 32. A piston ring 42 is provided about the main valve plug 32 and acts between the valve plug 32 and the inner wall of the cage 26 to restrict the annular flow path between the valve plug 32 and cage 26 to keep the clearance flow of inlet pressure to the top side of the valve plug 32 to a minimum.

The valve plug 32 is suitably affixed to a main valve plug stem 50 that is, in turn, connected to main actuator indicated schematically at 52. The yoke 54 of the actuator is adapted to be connected to the upper bonnet 18 by suitable fastening means. Packing means 56 are provided about the main valve plug stem 50 to seal between the valve plug stem 50 and the upper bonnet 18.

There are provided within the main valve plug 32 passage means 61 for communicating the chamber 60 with pressure in the flow passage 16. The chamber 60 is remote from flow passage 16 and is defined by the top of the main valve plug 32, the walls of the cage 26 and the lower portion of the bonnet 18. Passage means 61 include openings 62 in the top of the cup-shaped portion of the valve plug 32 and registration openings 64 in the hub portion 34 of the main valve plug 32. Openings 62 and 64 are connected by an axial opening 66 in the hub portion 34 which receives a secondary valve plug 68. The secondary valve plug 68 is adapted to abut against a shoulder or seat 69 defined in the main valve plug between the openings 62 and 64. The secondary valve plug 68 is suitably connected to a secondary valve plug stem 72 for actuation axially toward and away from seat 69. The valve plug steam 72 is connected with a secondary actuator indicated generally at 74. The actuator 74 includes a yoke 76 suitably affixed to the lower bonnet 20, as, for example, by locknut 78. Packing means 80 are provided about the valve plug stem 72 to seal between the valve plug stem 72 and the lower bonnet 20.

Normal flow of fluid through the main valve body 12 is through the inlet opening 13, the openings 38 in cage 26 beneath the main valve plug 32, through the main port or opening 40 in the valve seat portion 36 of the cage 26 and out the outlet 14. During flow or anytime that the secondary valve plug 68 is traveled open by the actuator 74, the pressure above the main valve plug 32 in chamber 60 and the pressure under the main valve plug 32 are equalized through the passage means 61 in the main valve plug, resulting in minimum actuator force requirements.

It will be noted that the registration openings 64 in the main valve plug are angled downwardly and outwardly, so as to sense accurately the pressure in the recessed area 33 below the inverted cup-shaped main valve plug 32. The pressure detected by the registration openings 64 must be representative of the average static pressure below the main valve plug. It was found that if a cup-shaped valve plug 32 were utilized which did not include the central hub portion, such that the secondary valve plug 68 acted directly against the valve seat 69 and pressure was sensed only axially of the main valve plug 32 that an improper pressure was registered against the top of the main valve plug. By fabricating the main vale plug 32 with a recessed area 33 and with outwardly disposed registration openings 64 in the hub portion 34, as shown, an average static pressure below the main valve plug can be registered in the chamber 60 above the main valve plug. The key to sensing an average static pressure is to locate the registration opening inlets away from the central portion of the hub 34.

During the period of shutoff, the secondary valve plug or actuator 68 closes off the pressure balance registration holes 64 in the main valve plug 32. With the main valve plug 32 on the seat 36 and the registration holes or openings 64 closed by secondary plug 68, the main valve plug 32 will be positively closed. Further, with the flow in the flow-down direction, the force developed on top of the main valve plug 32 in chamber 60 aids in a more positive closure of the main valve plug 32 against seat 36, as well as increasing the loading on the gasket 29 between the valve cage 26 and the wall 28 of main valve body 12.

The flow through the registration holes 64 when the main valve plug 32 is seated is in the flow-open direction for the secondary valve plug 68. The opening or hole defined in the valve seat 69 for closure by the secondary valve plug 68 is relatively small and can easily be handled by a relatively small secondary actuator 74.

In operation, the secondary valve plug 68 is opened first to equalize the pressure on top of the main valve plug 32 with that below the valve plug 32. This will allow the main actuator 52 to open main valve plug 32. The travel of the valve plug 68 is short, allowing guiding of the valve plug 68 within the bottom end of the hub portion 34 of the main valve plug 32 and keeping the pressure registration through main valve plug 32 at the proper position. The main valve plug 32 must close first before the secondary valve plug 68 can be actuated closed for final shutoff. The actuating means which include separate actuators 52 and 74 for operating the valve plugs 32 and 68, respectively, are interlocked for selective actuation of the valve plugs. The actuators may be pneumatically or mechanically interlocked, as desired.

Vent openings 59 in the wall of cage 26 permit condensate to escape from chamber 60 when the flow control device is used in steam applications. Openings 59 are located just above the top of the main or first valve plug 32 when the valve plug is seated against its seat 36.

The central hub portion 34, which may be formed unitarily with the cup-shaped portion or from a separate piece secured to the cup-shaped portion, may be provided with four registration holes 64 and the top of the cup-shaped portion of the main valve plug may be provided with two outlet openings 62.

The specific number of openings is not critical provided that the relationship of the area of the openings 64 with respect to the area of the clearance between cage 26 and plug 32 is maintained. The passage area through the main valve plug must be large enough to prevent pressure buildup in chamber 60 greater than that in the recess 33 below the main valve plug. A rule of thumb is that the area of the clearance be one-seventh the cross-sectional area of the passage means. The piston ring 42 aids in minimizing the cross-sectional area required in the passage means 61.

There has been provided by the present invention a flow control device capable of handling large flow capacity with tight shutoff. Provided within the housing means of the flow control device are two single-seated valve plugs which are actuated by interlocked actuator means, the first valve plug controlling the flow of fluid through the flow passage in the valve body and the second valve plug controlling pressurization of the side of the first valve plug remote from the flow passage.

While a presently preferred embodiment of the invention has been described and illustrated, it should be understood that the invention is not limited thereto, but may be otherwise embodied within the scope of the following claims.

We claim:

1. In a flow control device, a valve body having an inlet and an outlet communicated by a flow passage with a main valve seat therein, a first valve plug movable to open and close the flow passage, said valve plug cooperating with the valve body to form a chamber remote from the flow passage, passage means in the valve plug communicating the flow passage with the chamber, a second valve plug for opening and closing the passage means, and actuating means for selectively actuating the valve plugs and the second valve plug being opened before the first valve plug to equalize pressure in the chamber with pressure in the flow passage, the first valve plug being generally in the form of an inverted cup having a depending central hub portion, the passage means including an opening in the top of the cup and outwardly disposed registration opening in the hub portion, with a secondary valve seat defined between said opening in the top of the cup and said registration opening, said second valve plug being movable axially within said hub portion toward and away from engagement with said secondary valve seat, and a tubular valve cage disposed in the valve body, the first valve plug being movable axially in the valve cage, and said valve cage having opening means in the wall thereof, there being vent openings in the wall of the valve cage disposed above the top of the first valve plug when the first valve plug is seated against the main valve seat.

2. A flow control device as in claim 1 wherein the actuating means is operative to close the first valve plug before the second valve plug is closed.

3. A flow control device as in claim 1 wherein the actuating means includes a first actuator for the first valve plug and a second actuator for the second valve plug.

4. A flow control device as in claim 1 wherein the area of the registration opening is relatively small with respect to the area of the flow opening through the valve seat, the registration opening being disposed so as to sense the average static pressure in the space between the cup and the central hub portion.

5. A flow control device as in claim 1 wherein the area of clearance between the valve cage and the first valve plug is on the order of one-seventh of the cross-sectional area of said passage means.